United States Patent [19]
Fujiyoshi

[11] Patent Number: 4,781,320
[45] Date of Patent: Nov. 1, 1988

[54] METHOD FOR THE PRODUCTION OF A HEAT EXCHANGER

[75] Inventor: Tatsuya Fujiyoshi, Matsudo, Japan

[73] Assignee: Nihon Radiator Co., Ltd., Tokyo, Japan

[21] Appl. No.: 43,207

[22] Filed: Apr. 27, 1987

[51] Int. Cl.⁴ .............................................. B23K 31/02
[52] U.S. Cl. ..................................... 228/183; 228/207
[58] Field of Search ............... 228/183, 207, 181, 223, 228/224

[56] References Cited

U.S. PATENT DOCUMENTS

| 4,645,119 | 2/1987 | Haramaki et al. | 228/183 |
| 4,705,206 | 11/1987 | Kamuja et al. | 228/183 |

FOREIGN PATENT DOCUMENTS

| 0131444 | 1/1985 | European Pat. Off. | 228/183 |
| 0140267 | 5/1985 | European Pat. Off. | 228/183 |
| 0171580 | 10/1983 | Japan | 228/183 |
| 1049771 | 3/1986 | Japan | 228/183 |

Primary Examiner—Nicholas P. Godici
Assistant Examiner—Karen Skillman
Attorney, Agent, or Firm—Gordon W. Hueschen

[57] ABSTRACT

A method for the production of a heat exchanger having a core part thereof formed by joining a tube of aluminum material and heat-transfer fins of aluminum material with a brazing material, which method is characterized by effecting said brazing by the use of a flux obtained by suspending a potassium fluoroaluminate complex in an aqueous solution of a pigment-forming water-soluble compound.

7 Claims, 1 Drawing Sheet

METHOD FOR THE PRODUCTION OF A HEAT EXCHANGER

BACKGROUND OF THE INVENTION

1. Field of the Invention

This invention relates to a method for the production of a heat exchanger. More particularly, it relates to a method for the production of a heat exchanger having a core part thereof brazed by the use of a flux of potassium fluoroaluminate complex ($K_3AlF_6$ and $KAlF_4$, hereinafter referred to NOCORC flux), which heat exchanger core is made of an aluminum material and therefore is enabled to obviate the necessity for application of a coating subsequent to the brazing.

2. Description of the Prior Art

In recent years, the heat exchangers such as radiators for automobiles and condensers for car coolers use an aluminum material (aluminum or aluminum alloys) in their core parts for the purpose of reduction in weight.

In the heat exchanger made of an aluminum material, used as a condenser in a car cooler, for example, the core part thereof is produced by molding its heat transfer fins with an aluminum material clad with a brazing filler and its tube with an aluminum material, fitting the components to each other with the aid of a jig, for example, and brazing them. As is widely known, in the brazing of parts of an aluminum material, an aluminum oxide coating of a high melting point formed on the surface of the aluminum material is required to be removed from the positions destined to undergo brazing. Unless the brazing is carried out under special conditions in a vacuum or in an atmosphere of inert gas (inevitably by the use of an expensive apparatus), there is followed a practice of applying a flux for the removal of aluminum oxide at least on the positions expected to undergo brazing in advance of the brazing. The flux heretofore used for this purpose has been a mixture of inorganic chlorides (such as for example, alkali metal chlorides and alkaline earth metal compounds). Since such water-soluble compounds by nature are liable to corrode aluminum, however, the core part of the heat exchanger assembled by brazing has inevitably to be subjected to a cleaning work for the removal of flux residue subsequently to the brazing.

Recently, to take the place of the conventional flux of inorganic chlorides, NOCOLOK flux (Registered trademark of Alcan Research and Development Limited.) (potassium fluoroaluminate complex) has been proposed and adopted for actual use. This NOCOLOK flux possesses a characteristic property of remaining non-hygroscopic prior to brazing and becoming substantially water-insoluble subsequently to brazing and, at the same time, another characteristic property of assuming, while in a fused state, reactivity at a temperature below the melting point of the brazing filler and consequently functioning for aluminum oxide and remaining unreactive to aluminum (Japanese Patent Publication No. SHO 58(1983)-27,037). When the brazing is effected by the use of NOCOLOK flux, therefore, the phenomenon of the corrosion of aluminum by the residual flux experienced by the conventional flux of inorganic chlorides is substantially elminated.

Under the belief that application of a coating to a heat exchanger solely for improving the glare-proofing property and commercial value of the heat exchanger is very uneconomical, efforts have been devoted to development of a heat exchanger which can dispense with the coating work of such uneconomical and time-consuming nature. So far, there has been proposed a heat exchanger of the kind having a core part thereof formed by joining a tube of aluminum material and heat-transfer fins of aluminum material with a solder, which heat exchanger is characterized by the fact that at least part of the surface of the core part is coated with an inorganic sintered layer possessing a phase of the two complexes of pigment-containing potassium hexafluoroaluminate ($K_3AlF_6$) and potassium tetrafluoroaluminate ($KAlF_4$) (U.S. Ser. No. 765,385).

To be specific, this heat exchanger has originated in a new knowledge that when the flux made of a mixture of potassium hexafluoroaluminate and potassium tetrafluoroaluminate (NOCOLOK flux) is used as the flux during the brazing work, there is formed in consequence of the brazing, on the surface of aluminum material coated with this NOCOLOK flux, a water-insoluble, rigid inorganic sintered layer possessing a phase of two complexes of potassium hexafluoroaluminate and potassium tetrafluoroaluminate. Thus, by adding a pigment to the NOCOLOK flux thereby enabling this pigment to be eventually incorporated in the inorganic sintered layer to be formed on the surface of the aluminum material, there is formed a colored inorganic sintered layer capable of reducing the phenomenon of glare.

When the method which causes the pigment to be incorporated in the inorganic sintered layer by being added to the NOCOLOK flux is employed in the manufacture of the heat exchanger of the type under discussion, since the pigment such as carbon black is generally insoluble in an aqueous solution to be used as a dispersant for the NOCOLOK flux, required dispersion of the pigment in the flux of slurry constitution inevitably entails the work of stirring and the produced colored inorganic sintered layer has the possibility of suffering form uneven coloration.

This invention, therefore, is aimed at eliminating the drawbacks mentioned above.

To be specific, this invention has as an object the provision of a method for the production of a heat exchanger having a core part thereof soldered with the NOCOLOK flux, which method enables a heat exchanger possessing a sufficiently high glare-proofing property to be easily produced with high commercial value without requiring application of a coat to the surface thereof.

SUMMARY OF THE INVENTION

The object described abvoe is accomplished, in the production of a heat exchanger having a core part thereof formed by joining a tube of aluminum material and heat-transfer fins of aluminum material with a brazing material, by a method which is characterized by effecting the brazing by the use of a flux obtained by suspending a potassium fluoroaluminate complex in an aqueous solution of a pigment-forming water-soluble compound.

The term "pigment-forming water-soluble compound" as used in the present specification refers to at least one water-soluble inorganic compound which, by the heat used during the brazing work, is chemically converted into a water-insoluble stable colored substance. Naturally, this pigment-forming water-soluble compound must not be corrosive against the aluminum material.

DESCRIPTION OF PREFERRED EMBODIMENT

The expression "heat exchanger core" as used in this invention embraces the cores of radiators for automobiles, those of evaporators for car coolers, those of condensers for coolers, those of car heaters, etc., which each comprise a tube and heat transfer fins and, in the cores of radiators and car heaters, further comprise a seat plate, a reinforcement, etc. All these components are formed of aluminum material.

Figure 1:
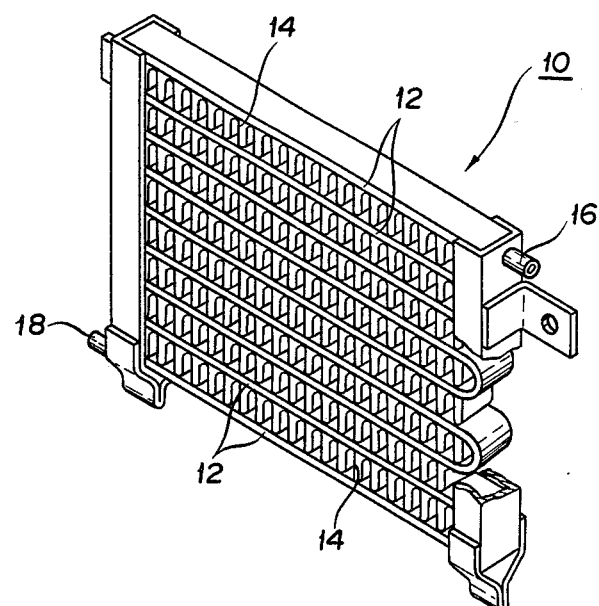
FIG. 1 is a perspective view illustrating a typical heat exchanger core according to the present invention.

For example, the serpentine type heat exchanger has an appearance as illustrated in FIG. 1. This condenser 10 is constructed by zigzagging a flattened tube 12 incorporating therein a multiplicity of holes (not shown) for passing refrigerant and nipping corrugated fins 14 between the adjacent webs of the zigzagged tube 12. The refrigerant which enters the condenser 10 through an inlet side conduit 16, flows through the interior of the tube 12, and departs from the condenser 10 through an outlet 18, therefore, exchanges heat with the air flowing along the fins 14. All the components of the condenser are formed of aluminum material.

For the passage of heat medium in the heat exchanger of this invention, there can be used a multiplicity of straight tubes circular, elliptic or rectangular in cross section, a zigzagged (serpentine) flat tube containing a multiplicity of parallely spaced continuous holes for passage of heat medium, or a tube-forming member composed of a multiplicity of tube units each produced by joining two tray-shaped plates (pieces) around their flange parts in the manner of a cream puff so as to give rise therein to a passage for heat medium.

PREFERRED EMBODIMENT OF THE INVENTION

In the present invention, the pigment-forming water-soluble compound is uniformly dispersed in the flux without requiring any treatment of stirring because this pigment-forming water-soluble compound is soluble in the aqueous solution being used as a dispersnat for the NOCOLOK flux. On the surface coated with this flux, therefore, the pigment which is formed in consequence of the chemical conversion of the aforementioned compound at the temperature of the brazing work is contained as uniformly dispersed in the water-insoluble inorganic sintered layer possessing a phase of the two complexes of potassium hexafluoroaluminate and potassium tetrafluoroaluminate. The inorganic sintered crystals exhibit a desirable glare-proofing property and high commercial value and the heat exchanger consequently produced requires no coating after the brazing work.

Now, the method of this invention for the production of a heat exchanger will be described in detail below with reference to a preferred embodiment cited below.

The aluminum material to be used in the present invention is not limited in any respect. Aluminum alloys of grades 1050, 1100, 3003, 3004, 3005, 3200, 5005, and 6951, for example, are available as the aluminum material. The brazing filler is an aluminum material which has a lower melting point than the aluminum material of which the tube and the fins are made. Generally, this aluminum material is an alloy of aluminum with 4.5 to 13.5% by weight of Si. The alloys which answer this description include such aluminum materials as 4034 (containing 4.5 to 6.0% by weight of Si), 4045 (containing 9.0 to 11.0% by weight of Si), 4343 (containing 6.8 to 8.2% by weight of Si), and 4047 (containing 11.0 to 13.0% by weight of Si). With consideration to the ease of the work to be involved, the brazing filler is clad on the aluminum material of at least either of the components to be joined.

The NOCOLOK flux to be used in the present invention is a mixture of potassium tetrafluoroaluminate ($KAlF_4$) and potassium hexafluoroaluminate ($K_3AlF_6$) which are a complex of potassium fluoride (KF) with aluminum fluoride ($AlF_3$). Generally, it is used in the form of an aqueous slurry. When it is used as an aqueous slurry, the mixing ratio of the mixture of potassium fluoroaluminate complexes and water is in the range of about 2:100 to about 20:100. This aqueous slurry is obtained by melting $AlF_3$ and KF simultaneously in an exact ratio, cooling the resultant mixture, comminuting the cooled mixture into particles of a suitable diameter, generally below 100 mesh, desirably below 150 mesh, and more desirably below 200 mesh, and mixing the comminuted substance with water in a prescribed ratio thereby suspending the substance in water and giving rise to a dilute aqueous slurry. Otherwise, potassium tetrafluoroaluminate and potassium hexafluoroaluminate may be prepared independently of each other and mixed at a prescribed ratio. A method for the preparation of potassium tetrafluoroaluminate is described in Broset: "Z. Anorg. Algem. Chemie, 239, 301–304 (1938).

A typical method adopted for the production of NOCOROC flux comprises adding two parts by weight of water to one part by weight of the comminuted mixture thereby producing a dilute slurry and adding a small amount of surfactant during the preparation of the slurry. The relative proportions of KF and $AlF_3$ used in the preparation of NOCOLOK flux are desired to approach the ratio of the azeotrope as much as possible. The NOCOLOK flux, therefore, substantially comprises a mixture of $K_3AlF_6$ and $KAlF_4$ of respective amounts to satisfy a $KF/AlF_3$ ratio (by weight) of 40:50 to 50:50. It contains substantially no unaltered KF.

In this invention, to the NOCOLOK flux obtained as described above, the pigment-forming water-soluble compound is added. This pigment-forming water-soluble compound is dissolved in an aqueous solution such as distilled water or deionized water to be used for suspending the potassium fluoroaluminate complexes. The pigment-forming watersoluble compound to be effectively used in this invention has only to fulfil the requirement that it should avoid obstructing removal of the aluminum oxide coating by the flux and should not be corrosive against the aluminum material. Preferably, this compound should be capable of forming a black to blackish purple pigment. The compound is generally used in an amount in the range of 2 to 60% by weight, based on the amount of the complex. The combination of nickel sulfate ($NiSO_4 6H_2O$) an potassium molybdate ($K_2MoO_4$), for example, is used. By the heat used during the brazing work, these compounds, nickel sulfate and potasium molybdate, are allowed to form a black salt of nickelmolybdic acid. Where nickel sulfate and potassium molybdate are used, these compounds are added each in a proportion of 1 to 30% by weight, preferably 10 to 20% by weight, based on the amount of the mixture of $K_3AlF_6$ and $KAlF_4$ contained in the slurry. If the proportion is less than 1% by weight, there is the possibility that the inorganic sintered layer formed on the surface of aluminum will not be colored sufficiently for manifestation of the glare-proofing property. If the proportion exceeds 30% by weight, there is the possibility that the brazing is not fully effected by the presence of the produced pigment.

Figure 2:
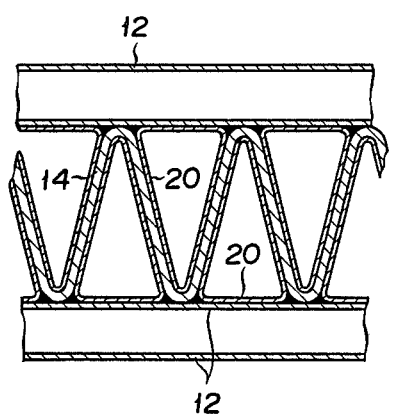
FIG. 2 is a magnified view of the essential part of the heat exchanger core of FIG. 1.

In the case of the condenser for a car cooler, for example, showing in FIGS. 1 and 2, heat transfer fins 14 such as corrugated fins are molded of a clad material prepared by having the aluminum material clad on both surfaces thereof with brazing filler and a tube 12 is molded of the aluminum material, the components are fitted to each other in a prescribed pattern optionally with the aid of a jig, and the flux containing the pigment forming water-soluble compound is applied by spraying or some other suitable method on the surface of the assembled condenser in a ratio of 1 to 10 g/m², preferably 2 to 5 g/m². In this case, the flux is not always required to be applied on the entire surface but is only required to be applied at least on the positions destined to undergo brazing and other positions necessary for the formation of an inorganic, sintered layer sufficient to acquire required glare-proofness. The assembled condenser coated with the flux is then placed in an oven and subjected to brazing at a temperature of about 595° to 620° C. for 0.5 to 5 minutes. In this case, the atmosphere in which the brazing is carried out is desired to be of a nonoxidative gas such as nitrogen, argon, or helium.

The heat exchanger core of this invention can be produced as described above. Where the flux remains on the surface, there is formed an inorganic, sintered layer 20 having a thickness of about 1 to 10 μm and colored with the pigment which is formed by the reaction of the pigment-forming water-soluble compound. This sintered layer is attached fairly strongly to the surface of the aluminum material and it is rigid and insoluble in water. Thus, it will not easily peel off the surface on the aluminum material.

Now, the method of this invention for the production of the heat exchanger will be described more specifically below with reference to working examples.

EXAMPLES 1–7 AND CONTROLS 1–2

By the addition of 90 parts by weight of deionized water to 10 parts by weight of a comminuted complex mixture of potassium fluoroaluminates (having an average particle diameter of 70 μm), there was prepared 10% by weight of NOCOLOK flux slurry. In this NOCOLOK flux slurry $NiSO_4 6H_2O$ and $K_2MoO_4$ were added in varying proportions indicated in Table 1 to be dissolved in the aqueous phase of the slurry. The NOCOLOK flux thus formed by the addition of $NiSO_4 6H_2O$ and $K_2MoO_4$ was applied to the part of a heat exchanger of aluminum intended for brazing at a rate of 5 g/m². Then, the heat exchanger was placed in a furnace and heated therein as enveloped in a non-oxidizing atmosphere of $N_2$ gas at 600° C. to braze the part.

As the result on the surface of the heat exchanger, there was invariably formed a sintered layer 2 to 3 μm in thickness. The product obtained in Examples 1–7 were found to possess satisfactory brazing property and glare-proofing property, whereas the product of Control 1 obtained a sintered layer sparingly colored in black and that of Control 2 had the tube and fins of the heat exchanger brazed defectively.

TABLE 1

| | Amount of $NiSO_4$ $6H_2O$ and $K_2MoO_4$ added (% by weight, based on the amount of the mixture of $K_3AlF_6$ and $KAlF_4$) | | Amount of adhered flux (g/m²) | Glare profness | Brazing capacity | Total estimation |
|---|---|---|---|---|---|---|
| | $NiSO_4$ $6H_2O$ | $K_2MoO_4$ | | | | |
| Example 1 | 1.0 | 1.0 | 5.2 | Grey, OK | Good | |
| Example 2 | 6.0 | 5.0 | 5.1 | Blackish grey, OK | Good | |
| Example 3 | 10.0 | 10.0 | 4.8 | Blackish grey, OK | Good | |
| Example 4 | 15.0 | 18.0 | 5.0 | Blackish grey, OK | Good | |
| Example 5 | 20.0 | 20.0 | 4.9 | Black, OK | Good | |
| Example 6 | 25.0 | 23.0 | 4.5 | Black, OK | Good | |
| Example 7 | 30.0 | 30.0 | 4.6 | Black, OK | Good | |
| Control 1 | 0.5 | 0.5 | 5.0 | Greyish white, NG | Good | × |
| Control 2 | 35.0 | 35.0 | 4.8 | Black, OK | Bad | × |

As described above, in the production of a heat exchanger having a core part thereof formed by joining a tube of aluminum material and heat-transfer fins of aluminum material with a brazing material, this invention is directed to a method which is characterized by effecting the brazing by the use of a flux obtained by suspending the potassium fluoroaluminate complex in an aqueous solution of the pigment-forming water-soluble compound. At least part of the heat exchanger thus producted is coated with an inorganic sintered laeyr possessing a phase of the two complexes of potassium hexafluoroaluminate and potassium tetrafluoroaluminate. This sintered layer is colored with the pigment which is formed by the pigment-forming water-soluble compound when it is chemically converted by the heat used during the work of brazing. The sintered layer possesses a sufficient glare-proofing property without requiring a surface treatment as by coating. Further, since this pigment-forming water-soluble compound is uniformly dispersed in the flux, the distribution of the pigment in the inorganic sintered laeyr is similarly uniform. The colored inorganic sintered layer, therefore, is free from the uneven coloration and enjoys a very high commercial value from the standpoint of appearance. Moreover, this colored inorganic sintered layer can be obained by a procedure resembling the conventional method without requiring any extra operational step, excepting the NOCOLOK flux having the pigment-forming water-soluble compound dissolved in the aqueous phase thereof is used as the flux. Since the method of this invention has no use for the work of coating, the procedure involved therein is simple and brief as compared with that involved in the conventional method of production and the heat exchanger obtained thereby can be offered at a proportionally low price. Further, the method of this invention permits the pigment-forming water-soluble compound added to the NOCOLOK flux to be dispersed more readily and more uniformly therein than the pigment added to the same NOCO-LOK flux by the conventional method. Thus, no uneven coloration can occur in the colored inorganic sintered layer consequently formed on the produced heat exchanger.

What is claimed is:

1. A method for the production of a heat exchanger having a core part thereof formed by joining a tube of aluminum material and heat-transfer fins of aluminum material with a brazing material, which method is characterized by effecting said brazing by the use of a flux obtained by suspending a potassium fluoroaluminate complex in an aqueous solution of a pigment-forming water-soluble compound, wherein said pigment-forming water-soluble compound is a mixture of nickel sulfate with potassium molybdate.

2. A method according to claim 1, wherein said pigment-forming water-soluble compound is incorporated in an amount in the range of 2 to 60% by weight, based on the amount of said complex.

3. A method according to claim 2, wherein said flux is applied in a ratio in the range of 1 to 10 g/m$^2$.

4. A method according to claim 2, wherein said potassium fluoroaluminate complex comprises the two complexes of potassium hexafluoroaluminate and potassium tetrafluoroaluminate.

5. A method according to claim 1, wherein nickel sulfate and potassium molybdate are incorporated each in an amount in the range of 1 to 30% by weight, based on the amount of said complex.

6. A method according to claim 4, wherein nickel sulfate and potassium molybdate are incorporated each in an amount in the range of 10 to 20% by weight, based on the amount of said complex.

7. A method according to claim 1, wherein said brazing is carried out at a temperature in the range of about 595° to 620° C.

* * * * *

UNITED STATES PATENT AND TRADEMARK OFFICE
CERTIFICATE OF CORRECTION

PATENT NO.  : 4,781,320
DATED       : November 1, 1988
INVENTOR(S) : Tatsuya Fujiyoshi It is certified that error appears in the above-identified patent and that said Letters Patent is hereby corrected as shown below:

```
Title Page, [56] References Cited, U.S. PATENT DOCUMENTS, line 2;
   "Kamuja et al." should read -- Kamiya et al. --  (See original
   Letters Patent No. 4,705,206)
Col. 1, line 63; "elminated" should read -- eliminated --
Col. 2, line 52; "abvoe" should read -- above --
Col. 3, line 46; "dispersnat" should read -- dispersant --
Col. 4, line 51; "watersoluble" should read -- water-soluble --
Col. 4, line 63; "potasium" should read -- potassium --
Col. 6, Table 1, fifth column, second line of that column heading;
   "profness" should read -- proofness --
Col. 6, Table 1, last column, the first seven lines (Examples 1-7)
   should have -- O -- in the space that is blank
Col. 6, line 41; "laeyr" should read -- layer --
Col. 6, line 52; "laeyr" should read -- layer --
Col. 6, line 54; delete "the"
Col. 6, line 57; "obained" should read -- obtained --
```

Signed and Sealed this

Fifth Day of September, 1989

Attest:

Attesting Officer

DONALD J. QUIGG

Commissioner of Patents and Trademarks